United States Patent
Rusek et al.

(10) Patent No.: US 12,200,664 B2
(45) Date of Patent: Jan. 14, 2025

(54) METHOD OF OPERATING A WIRELESS COMMUNICATION DEVICE IN A DISCONNECTED OPERATIONAL MODE, WIRELESS COMMUNICATION DEVICE AND BASE STATION

(71) Applicant: Sony Group Corporation, Tokyo (JP)

(72) Inventors: Fredrik Rusek, Eslöv (SE); Jose Flordelis, Lund (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 345 days.

(21) Appl. No.: 17/794,981

(22) PCT Filed: Feb. 12, 2021

(86) PCT No.: PCT/EP2021/053438
§ 371 (c)(1),
(2) Date: Jul. 24, 2022

(87) PCT Pub. No.: WO2021/160792
PCT Pub. Date: Aug. 19, 2021

(65) Prior Publication Data
US 2023/0082719 A1 Mar. 16, 2023

(30) Foreign Application Priority Data
Feb. 14, 2020 (SE) .................... 2030050-5

(51) Int. Cl.
*H04W 68/02* (2009.01)
*H04W 52/02* (2009.01)
*H04W 56/00* (2009.01)

(52) U.S. Cl.
CPC ....... *H04W 68/02* (2013.01); *H04W 52/0229* (2013.01); *H04W 56/001* (2013.01)

(58) Field of Classification Search
CPC .......................... H04W 68/02; H04W 52/0229; H04W 56/001
See application file for complete search history.

(56) References Cited

U.S. PATENT DOCUMENTS

| 11,546,853 B2 * | 1/2023 | Agiwal | ................ H04W 72/53 |
| 12,082,113 B2 * | 9/2024 | Agiwal | ................ H04W 76/11 |

(Continued)

FOREIGN PATENT DOCUMENTS

| JP | 2020501431 A | 1/2020 |
| WO | 2018172347 A1 | 9/2018 |

(Continued)

OTHER PUBLICATIONS

International Search Report and Written Opinion from corresponding International Application No. PCT/EP2021/053438, May 17, 2021, 13 pages.

(Continued)

*Primary Examiner* — Adam D Houston
(74) *Attorney, Agent, or Firm* — Tucker Ellis LLP

(57) ABSTRACT

A method of operating a wireless communication device (or, simply device) is provided. The wireless communication device is configured for communication with a wireless communications network in a disconnected operational mode. The method comprises: monitoring for at least one wake-up signal included in a beam-swept burst of multiple wake-up signals in the disconnected operational mode prior to a paging occasion included in a beam swept burst of multiple paging occasions, wherein the at least one wake-up signal enables the wireless communication device to synchronize with the wireless communications network, and wherein the at least one wake-up signal is indicative of at least one time-frequency resource element of the paging occasion allocated to a paging indication that is transmitted using the same downlink transmit beam as the at least one wake-up signal; and responsive to detection of the at least (Continued)

one wake-up signal, monitoring the at least one time-frequency resource element of the downlink transmit beam where the wake-up signal was detected for a paging indication based on the detected at least one wake-up signal, wherein the detected at least one wake-up signal enables the wireless communication device to receive the paging indication without first monitoring for a synchronization signal block.

14 Claims, 8 Drawing Sheets

(56) References Cited

U.S. PATENT DOCUMENTS

| | | | | |
|---|---|---|---|---|
| 2007/0206626 A1* | 9/2007 | Lee | ............... | H04B 7/0417 |
| | | | | 370/437 |
| 2018/0270756 A1 | 9/2018 | Bhattad | | |
| 2021/0368448 A1* | 11/2021 | Li | ............... | H04W 52/0235 |
| 2021/0377864 A1* | 12/2021 | Li | ............... | H04W 72/044 |
| 2023/0082719 A1* | 3/2023 | Rusek | ............... | H04W 56/001 |
| | | | | 455/458 |
| 2023/0180130 A1* | 6/2023 | Gupta | ............... | H04W 72/044 |
| | | | | 370/329 |
| 2024/0236944 A1* | 7/2024 | Jiang | ............... | H04W 68/005 |
| 2024/0237135 A1* | 7/2024 | Wu | ............... | H04W 76/28 |
| 2024/0259978 A1* | 8/2024 | Suh | ............... | H04W 76/10 |

FOREIGN PATENT DOCUMENTS

| | | | |
|---|---|---|---|
| WO | WO-2019055421 A1 | 3/2019 | |
| WO | WO-2019063479 A1 | 4/2019 | |
| WO | 2019086674 A1 | 5/2019 | |
| WO | WO-2019104731 A1 | 6/2019 | |
| WO | 2019143937 A1 | 7/2019 | |
| WO | WO-2019168455 A1 | 9/2019 | |
| WO | 2019190205 A1 | 10/2019 | |
| WO | 2020033648 A1 | 2/2020 | |

OTHER PUBLICATIONS

Office Action and Search Report from corresponding Swedish Application No. 2030050-5, Jan. 20, 2021, 12 pages.

Sony, "WUS aspects on grouping and mobility for efeMTC and feNB-IoT," 3GPP TSG RAN WG2 Meeting #100, R2-1712993, Nov. 27-Dec. 1, 2017, 6 pages.

3rd Generation partnership project (3GPP), "Technical Specification Group Radio Access Network; NR; Physical layer procedures for control 9Releae 16)," 3GPP TS 38.213 V16.0.0, Dec. 2019, 146 pages.

3rd Generation partnership project (3GPP), "Technical Specification Group Services and System Aspects; System architecture for the 5G System (5GS); Stage 2 (Release 16)," 3GPP TS 23.501 V16.3.0, Dec. 2019, 417 pages.

3rd Generation partnership project (3GPP), "Technical Specification Group Services and System Aspects; Procedures for the 5G System (5GS); Stage 2 (Release 16)," 3GPP TS 23.502 V167.3.0, Dec. 2019, 558 pages.

3rd Generation partnership project (3GPP), "Technical Specification Group Radio Access Network; NR; NR AND NG-RAN Overall Description; Stage 2 (Release 15)," 3GPP TS 38.300 V15.0.0, Dec. 2017, 68 pages.

* cited by examiner

METHOD OF OPERATING A WIRELESS COMMUNICATION DEVICE IN A DISCONNECTED OPERATIONAL MODE, WIRELESS COMMUNICATION DEVICE AND BASE STATION

FIELD OF THE INVENTION

Various embodiments relate to a method of operating a wireless communication device, a wireless communication device and a base station. Various embodiments relate in particular to operation of wireless communication devices in relation to paging in a disconnected operational mode.

BACKGROUND OF THE INVENTION

Wireless communication is widespread. There is a common concern to reduce the power consumption at wireless communication devices.

Some wireless communication system enable wireless communication devices to reduce their power consumption by not maintaining a persistent connection to the respective serving network. The serving network may use paging to notify disconnected devices, such as devices in idle or inactive mode, of events which may require their return to a connected operational mode.

Some wireless communication systems operate in a millimeter wave frequency range. FR2, or Frequency Range 2, refers to a millimeter wave frequency range from 24.25 GHz to 52.6 GHz having relatively high attenuation, i.e., path loss. This power loss is at least partly overcome by beamforming. At base stations, RF-based analog beamforming may be employed to this end. In such cases, only one beam can be formed per set of antenna elements at a time, and comprehensive cell coverage requires a multi-beam operation such as beam sweeping, in which a burst of multiple beams is periodically transmitted, each beam having a predefined direction and covering a part of the cell.

It has been observed that paging operation can require significant power consumption at the wireless communication device when operating in FR2, for example.

BRIEF SUMMARY OF THE INVENTION

In view of the above, there is a continued need in the art for methods and devices which address some of the above needs.

This need is met by the features of the independent claims. The dependent claims define embodiments.

Various techniques are based on the finding that often before a wireless communication device (UE) can receive a paging signal, the device may require to synchronize with the communications network. For example, the synchronization can generally refer to aligning the local timing reference with a timing reference at the communications network. The timing reference may be aligned with a periodic frame structure of the wireless link. Synchronization can enable a clock of the device to lock into the correct frequency and time of the periodic frame structure.

To provide the synchronization, typically, a base station (BS) of the communications network repeatedly and/or periodically transmits synchronization signal blocks (SSBs). It is possible that a beam-swept burst of multiple SSBs is transmitted. Each of the multiple SSBs may be associated with a corresponding paging occasion (PO) in a beam-swept burst of multiple POs. Upon synchronization, the device may thus know which PO to listen to, i.e., at which PO the device should monitor for the paging signal.

It has been found that the monitoring for the SSB prior to the PO can require significant power at the device. According to various examples, it is possible to reduce the power consumption required to prepare for the PO.

According to various examples, this is achieved by using so-called wake-up signal (WUS) operation. More specifically, the device may monitor for a WUS and derive a time-frequency position of one or more paging signals from reading the WUS.

This underlying principle is not limited to any particular frequency range, and is suitable for various scenarios where beamforming is needed having relatively high associated power cost.

A method of operating a wireless communication device (or, simply device) is provided. The wireless communication device is configured for communication with a wireless communications network in a disconnected operational mode. The method comprises: monitoring for at least one wake-up signal included in a beam-swept burst of multiple wake-up signals in the disconnected operational mode prior to a paging occasion included in a beam swept burst of multiple paging occasions, wherein the at least one wake-up signal enables the wireless communication device to synchronize with the wireless communications network, and wherein the at least one wake-up signal is indicative of at least one time-frequency resource element of the paging occasion allocated to a paging indication that is transmitted using the same downlink transmit beam as the at least one wake-up signal; and responsive to detection of the at least one wake-up signal, monitoring the at least one time-frequency resource element of the downlink transmit beam where the wake-up signal was detected for a paging indication based on the detected at least one wake-up signal, wherein the detected at least one wake-up signal enables the wireless communication device to receive the paging indication without first monitoring a synchronization signal block.

A computer program or a computer-program product or a computer-readable storage medium including program code is provided. The program code can be loaded and executed by at least one processor. Upon loading and executing the program code, the at least one processor performs a method of operating a wireless communication device. The wireless communication device is configured for communication with a wireless communications network in a disconnected operational mode. The method comprises: monitoring for at least one wake-up signal in the disconnected operational mode prior to a paging occasion; and responsive to detection of the at least one wake-up signal, monitoring for a paging indication in the paging occasion. The at least one wake-up signal is indicative of at least one time-frequency resource element of the paging occasion allocated to the paging indication.

The at least one wake-up signal may be included in a beam-swept burst of multiple wake-up signals, wherein the paging indication is included in a beam-swept burst of multiple paging occasions, and wherein the at least one wake-up signal and the paging indication are transmitted using the same downlink transmit beam.

The method may further comprise: responsive to the detection of at least two wake-up signals of the beam-swept burst of multiple wake-up signals, selecting one of the at least two wake-up signals and monitoring for the paging indication at the at least one time-frequency resource element of the paging occasion indicated by the selected wake-up signal.

The wake-up signal may relatively indicate the at least one time-frequency resource element with respect to a reference.

The reference may comprise at least one of a timing of the at least one wake-up signal, a frequency of the at least one wake-up signal, or a timing of the paging occasion.

The wake-up signal may be indicative of an index of a frame element of transmission protocol implemented by the wireless communications network. The frame element may comprise the at least one time-frequency resource element of the paging occasion.

The wake-up signal may comprise an explicit indicator of the at least one time-frequency resource element or comprising a codebook index associated with a codebook of candidate time-frequency resource elements.

The method may further comprise determining at least one further time-frequency resource element of a random-access occasion based on the at least one time-frequency resource element of the paging occasion, and responsive to a detection of the paging indication, accessing the random-access occasion.

The method may further comprise: responsive to a failed detection of the at least one wake-up signal, monitoring for a synchronization signal block broadcasted by the wireless communications network prior to the paging occasion, and responsive to the detection of the at least one wake-up signal, skipping the monitoring for the synchronization signal block broadcasted by the wireless communications network prior to the paging occasion.

The method may further comprise: based on a receive property of the wake-up signal, determining a receive beam, wherein the monitoring for the paging occasion is using the receive beam.

The method may further comprise: synchronizing with the wireless communications network based on the detection of the wake-up signal.

The monitoring for the wake-up signal may comprise non-coherent demodulation of the wake-up signal or coherent demodulation of the wake-up signal.

A wireless communication device for communication with a wireless communications network in a disconnected operational mode is provided. The wireless communication device comprises a wireless interface and a processing unit which are configured for:

monitoring for at least one wake-up signal in the disconnected operational mode prior to a paging occasion; and responsive to detection of the at least one wake-up signal, monitoring for a paging indication in the paging occasion. The at least one wake-up signal is indicative of at least one time-frequency resource element of the paging occasion allocated to the paging indication.

The wireless communication device may be configured for performing the method according to various embodiments.

A method of operating a base station configured for communication with a wireless communication device is provided. The base station is part of a wireless communications network. The method includes transmitting at least one wake-up signal prior to a paging occasion. The method further includes, responsive to said transmitting of the at least one wake-up signal, transmitting a paging indication in the paging occasion. The at least one wake-up signal is indicative of at least one time-frequency resource element of the paging occasion allocated to the paging indication.

A computer program or a computer-program product or a computer-readable storage medium including program code is provided. The program code can be loaded and executed by at least one processor. Upon loading and executing the program code, the at least one processor performs a method of operating a base station configured for communication with a wireless communication device is provided. The base station is part of a wireless communications network. The method includes transmitting at least one wake-up signal prior to a paging occasion. The method further includes, responsive to said transmitting of the at least one wake-up signal, transmitting a paging indication in the paging occasion. The at least one wake-up signal is indicative of at least one time-frequency resource element of the paging occasion allocated to the paging indication.

For instance, the at least one wake-up signal can be transmitted to one or more wireless communication devices that operate in a disconnected operational mode.

A base station is provided. The base station comprises a wireless interface and a processing unit which are configured for: transmitting at least one wake-up signal prior to a paging occasion; and responsive to transmitting the at least one wake-up signal, transmitting a paging indication in the paging occasion. The at least one wake-up signal is indicative of at least one time-frequency resource element of the paging occasion allocated to the paging indication.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

Embodiments of the invention will be described with reference to the accompanying drawings, in which the same or similar reference numerals designate the same or similar elements.

DETAILED DESCRIPTION OF EMBODIMENTS

Figure 1:
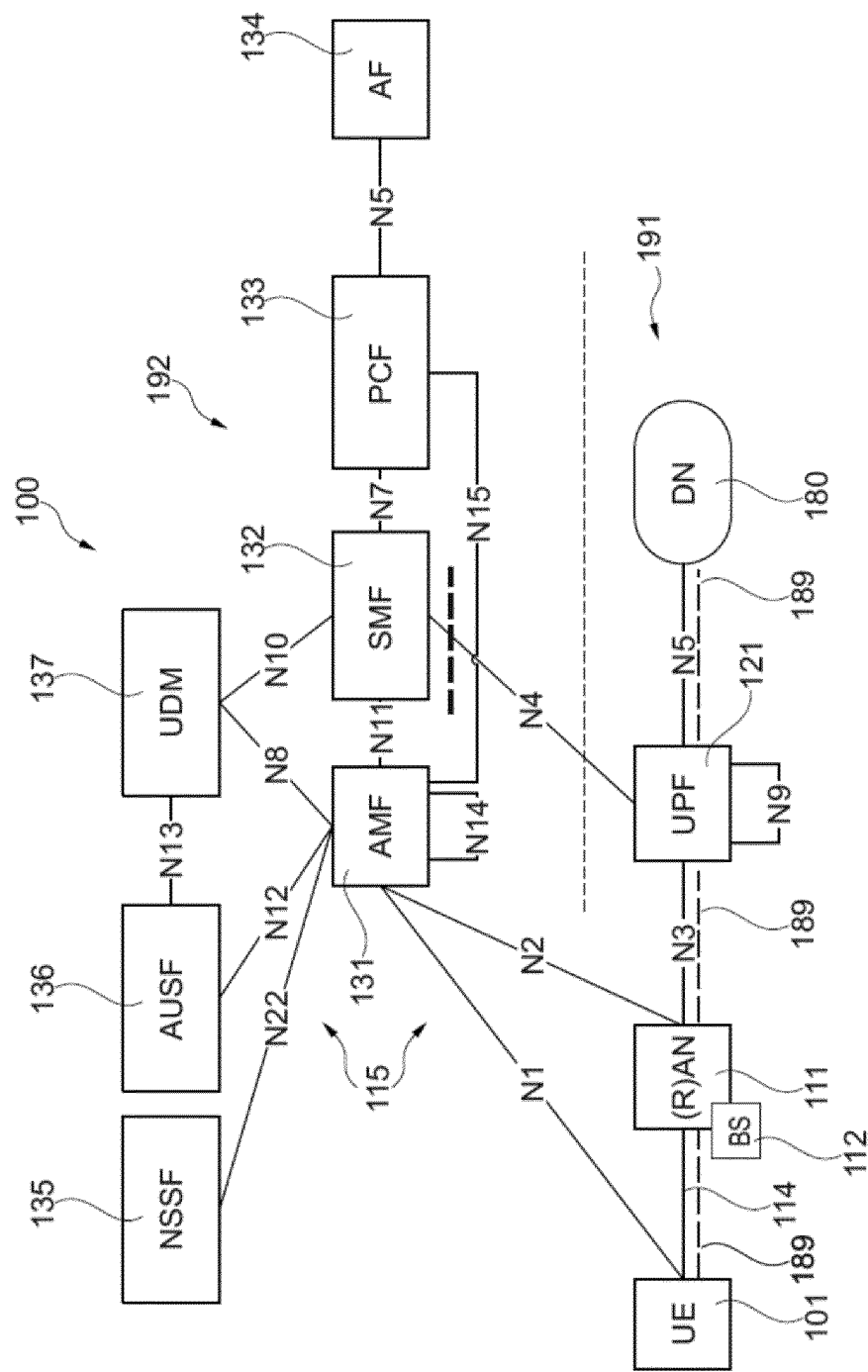
FIG. 1 schematically illustrates, in accordance with various examples, a functional architecture of a wireless communications network.

Exemplary embodiments of the invention will now be described with reference to the drawings. While some embodiments will be described in the context of specific fields of application, the embodiments are not limited to this field of application. Further, the features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art.

Hereinafter, techniques are described that facilitate an efficient preparation for a PO at a wireless communication device operating in a disconnected mode. The wireless communication device can obtain information regarding a timing and a frequency to be monitored for one or more paging signals transmitted by a communications network (NW). The wireless communication device can, in particular, use a WUS prior to the PO to obtain an indication of at least one time-frequency resource element of the PO allocated to a paging signal, e.g., a paging indication. Alternatively or additionally, the WUS can be used to synchronize with the communications NW. This can help to skip, e.g., monitoring for a further synchronization signal prior to the PO.

According to examples, a method of operating a wireless communication device (or, simply device) is provided. The wireless communication device is configured for communication with a wireless communications network in a disconnected operational mode. The method comprises: monitoring for at least one wake-up signal included in a beam-swept burst of multiple wake-up signals in the disconnected operational mode prior to a paging occasion included in a beam swept burst of multiple paging occasions, wherein the at least one wake-up signal enables the wireless communication device to synchronize with the wireless communications network, and wherein the at least one wake-up signal is indicative of at least one time-frequency resource element of the paging occasion allocated to a paging indication that is transmitted using the same downlink transmit beam as the at least one wake-up signal; and responsive to detection of the at least one wake-up signal, monitoring the at least one time-frequency resource element of the downlink transmit beam where the wake-up signal was detected for a paging indication based on the detected at least one wake-up signal, wherein the detected at least one wake-up signal enables the wireless communication device to receive the paging indication without first monitoring for a synchronization signal block, in particular a burst of multiple synchronization signal blocks. In other words, the wake-up signal may enable the wireless communication device to receive the paging indication without first reading or first listening to a synchronization signal burst.

Monitoring for at least one wake-up signal included in a beam-swept burst of multiple wake-up signals may be more power efficient than monitoring for a synchronization signal block. In some examples, the wake-up signal may be detectable by a lower power receiver. Thus, additional power savings may be obtained.

The synchronization requirements for detecting the wake-up signal may be lighter than for detecting the paging indication. For example, the synchronization requirements for detecting the wake-up signal may be less strict than for detecting the paging indication. Accordingly, faster synchronization may be obtained.

Moreover, the paging cycle may be shorter as monitoring for a synchronization signal block may be skipped. Thus, paging may be more efficient if the proposed method is performed.

According to various examples, the paging operation and the WUS operation as described above can be combined with a multi-beam operation. In particular, it would be possible to use multiple transmit beams at a BS of the communications NW to transmit the WUS. A respective downlink beam sweep can be defined. A beam-swept burst of the WUS can be implemented. In a similar manner, it is possible to use multiple transmit beams at the BS to transmit the one or more paging signals. Thus, the multiple instances of the one or more paging signals being transmitted using a respective transmit beam can define a beam-swept burst of multiple paging occasions. It would be possible that the multiple transmit beams used at the BS to transmit the WUS are correlated with the multiple transmit beams used to transmit the one or more paging signals. There can be an association between the particular instance of the WUS in the beam-swept burst and the particular instance of the one or more paging signals of the beam-swept burst of POs. Then, the wireless communication device can determine an appropriate receive beam to monitor for the one or more paging signals based on a detection of the WUS. The wireless communication device can select the appropriate PO to monitor based on the detection of the WUS.

Thus, generally speaking, the WUS being indicative of at least one time-frequency resource element of a PO facilitates formation of a beam pair at the wireless communication device and the BS for monitoring for one or more paging signals, in a multi-beam operation.

FIG. 1 schematically illustrates, in accordance with various examples, a functional architecture of a wireless communications network 100, and in particular of a cellular network 100.

The example of FIG. 1 illustrates the wireless communications network 100 according to the 3GPP NR/5G architecture. The term "New Radio" (NR) as used herein refers to a radio access technology (RAT) specifically standardized by the 3GPP for the fifth generation (5G) mobile network. Details of the 3GPP NR/5G architecture are described in 3GPP TS 23.501, version 16.3.0 (2019-12).

While FIG. 1 and further parts of the following description illustrate techniques in the 3GPP NR/5G framework of a wireless communications network, similar techniques may be readily applied to other communication protocols. Examples include 3GPP LTE 4G—e.g., in the MTC or NB-IoT framework—and even non-cellular wireless systems, e.g., an IEEE Wi-Fi technology.

In the scenario of FIG. 1, a wireless communication device 101 is connectable to the wireless communications network 100 via a data connection. For example, the wireless communication device 101, also known as User Equipment (UE), may be one of the following: a cellular phone; a smart phone; an IoT device; a MTC device; a sensor; an actuator; etc.

The wireless communication device 101 is connectable to a core NW (CN) 115 of the wireless communications network 100 via a RAN 111, typically formed by one or more BSs (BS) 112 (only a single BS 112 is illustrated in FIG. 1 for sake of simplicity). In the 3GPP NR/5G networks, a BS is abbreviated as gNB. A wireless link 114 is established between the RAN 111—specifically between one or more of the BSs 112 of the RAN 111—and the wireless communication device 101. The wireless link 114 implements a time-frequency resource grid. Typically, OFDM is used: here, a carrier includes multiple subcarriers. The subcarriers (in frequency domain) and the symbols (in time domain) then define time-frequency resource elements of the time-frequency resource grid. Thereby, a protocol time base is defined, e.g., by the duration of frames and subframes including multiple symbols and the start and stop positions of the frames and subframes. Different time-frequency resource elements can be allocated to different logical channels or reference signals (RSs) of the wireless link 114. Examples include: Physical DL Shared Channel (PDSCH); Physical DL Control Channel (PDCCH); Physical UL Shared Channel (PUSCH); Physical UL Control Channel (PUCCH); channels for random access; etc.

The CN 115 includes a user plane (UP) 191 and a control plane (CP) 192. Application data—e.g., of a data service—is typically routed via the UP 191. For this, there is provided a UP function (UPF) 121. The UPF 121 may implement router functionality. Application data may pass through one or more UPFs 121. In the scenario of FIG. 1, the UPF 121 acts as a gateway towards a data NW (DN) 180, e.g., the Internet or a Local Area NW. Application data can be communicated between the wireless communication device 101 and one or more servers 181 (not shown in FIG. 1) of the data NW 180.

The wireless communications network 100 also includes a mobility control node, here implemented by an Access and Mobility Management Function (AMF) 131. The wireless communications network 100 also includes a session-control node, here implemented by a Session Management Function (SMF) 132. The wireless communications network 100 further includes a Policy Control Function (PCF) 133; a NW Slice Selection Function (NSSF) 135; an Authentication Server Function (AUSF) 136; and a Unified Data Management (UDM) 137. FIG. 1 also illustrates the protocol reference points N1-N22 between these nodes. The AMF 131 provides one or more of the following functionalities: connection management sometimes also referred to as registration management; NAS termination for communication between the CN 115 and the wireless communication device 101; connection management; reachability management; mobility management; connection authentication; and connection authorization.

After wireless communication device registration to the NW, the AMF 131 creates a wireless communication device context and keeps this wireless communication device context, typically at least as long as the wireless communication device 101 is registered to the wireless communications network 100. The wireless communication device context can hold one or more identities of the wireless communication device 101 (UE ID), e.g., temporary identities. The SMF 132 supports a data connection 189 (not shown in FIG. 1). The data connection 189 is established by the SMF 132 if the respective wireless communication device 101 operates in a connected mode. When the wireless communication device 101 operates in a disconnected mode, the data connection is released, at least along the wireless link 114 between the wireless communication device 101 and the RAN 111. The data connection 189 is established on the wireless link 114. The wireless link 114 can pertain to the underlying physical medium and the data connection 189 can include a set of logical channels, scheduling rules, etc. The data connection 189 may include one or more data flows or bearers such as a dedicated data flow/bearer or a default data flow/bearer. The state of the data connection is also defined on the Radio Resource Control (RRC) layer, e.g., generally Layer 3 of the OSI model. The SMF 132 provides one or more of the following functionalities: session management including session establishment, modify and release, including data flow/bearer set up of UP data flows/bearers between the RAN 111 and the UPF 121; selection and control of UPFs; configuring of traffic steering; etc.

Figure 2:
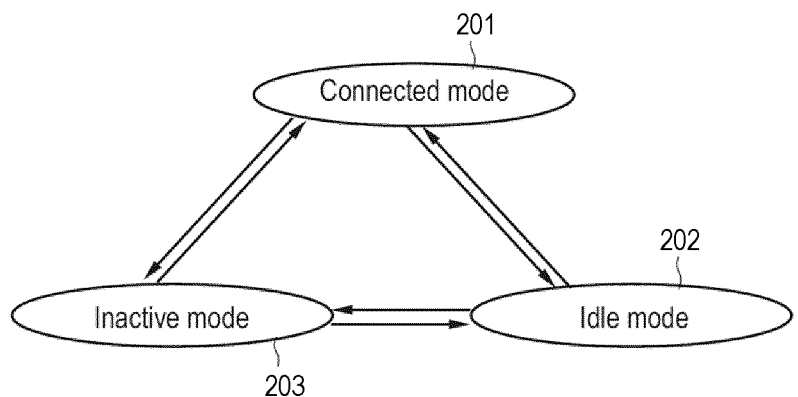
FIG. 2 schematically illustrates, in accordance with various examples, operational modes of the wireless communication device.

FIG. 2 schematically illustrates, in accordance with various examples, different operational modes 201-203 of the wireless communication device 101.

Example implementations of the operational modes 201-202 are described, e.g., in 3GPP TS 38.300, e.g., version 15.0.0.

When operating in a connected mode 201, the data connection 189 is set up. For example, a default bearer and optionally one or more dedicated bearers may be set up between the wireless communication device 101 and the wireless communications network 100. A wireless interface 1011 (cf. FIG. 11) of the wireless communication device 101 may persistently operate in an active state, or may employ a discontinuous reception (DRX) cycle that defines repetitive transitions to an inactive state in which at least some components of the wireless interface are shut down.

FIG. 2 also illustrates an idle mode 202 in which the data connection 189 is released. The idle mode 202 is a possible implementation of a disconnected mode. In the idle mode 202 the data connection 189 is released also towards the CN 115. When operating in the idle mode 202, the wireless communication device 101 may be configured to monitor for WUSs and paging signals, e.g., paging indications and, optionally, paging messages. The paging signals can be transmitted in accordance with a timing of POs. The timing of the POs may be aligned with a DRX cycle, which defines alternating periods of receptivity (ON-period) and non-receptivity (OFF-period) of the device 101. During the ON-period, the wireless interface may be operated in an active state; and during the OFF-period the wireless interface may be operated in an inactive state.

FIG. 2 also illustrates an inactive mode 203. The inactive mode 203 is a possible implementation of a disconnected mode. The inactive mode 203 is associated with a suspended data connection 189, e.g., after an inactivity timer expiry. The data connection 189 can be quickly resumed by transitioning to connected mode 201. For example, the AMF 131 may not be involved using NAS control signaling to transition from the connected mode 201 to the inactive mode 203; thus, the connected mode 201 vs. inactive mode 203 may be transparent to the CN 115 including the AMF 131. The data connection 189 may be selectively released or suspended along the wireless link 114; but not towards the CN 115.

WUS operation has become a popular method for reducing power spent by wireless communication devices on monitoring paging in a disconnected operational mode. Conventionally, devices associated with a same PO needed to monitor the paging channels periodically to learn whether they are being paged. WUS has been introduced to trigger the devices associated with a same PO as needed to obtain some knowledge whether they are being paged or likely to be paged, prior to the PO.

A WUS is typically identical for one or more (i.e., a group of) wireless communication devices listening to the same PO, meaning that if one device of the group is paged, all devices of that group will be awaken. This implies that a device that is woken by WUS is most likely not actually paged. To find out, the device reads the actual paging signal.

In NR connected operation mode, PDCCH-based WUS has been introduced in NR Release 16, which assumes a suitable beam pair has already been established. For WUS detection the device already needs to be fully synchronized.

In LTE-MTC and LTE-NB-IoT idle operational modes, WUS has been introduced in LTE Release 15. MTC and NB-IoT devices are low power devices and operate in FR1, i.e., sub-millimeter wave frequency range, where multi-beam operation is not needed.

"Paging" as used herein may refer to a mechanism used by the wireless communication network 100, and in particular by its BSs 112, to notify devices 101 operating in disconnected operational modes 202, 203 of events which may require a return to a connected mode 201.

A "paging signal" as used herein may refer to a combination of a paging indication and a paging message.

A "paging indication" as used herein may refer to a paging identifier (P-RNTI) transmitted in a PDCCH of a PO. The paging identifier may refer to a group of wireless communication devices 101.

A "PO" (PO) as used herein may refer to a slot or subframe or slots or subframes of the time-frequency resource grid implemented by the wireless link 114.

A "paging message" as used herein may refer to an RRC paging message transmitted in a PDSCH and potentially comprising a device identifier (UE identity) of a paged device 101. More specifically, a serving BS 112 allocates a PDSCH to a paged device 101 and uses PDCCH to transmit downlink control information (DCI) addressing the PDSCH. The wireless communication device 101 may monitor the PDCCH, and subsequently monitor the PDSCH based on this DCI in the PDCCH.

As a general rule, WUSs may be employed in connected mode 201 and/or idle mode 202 and/or the inactive mode 203. For example, in connected mode 201, a wireless communication device context for the data connection 189 may be buffered and may be reloaded upon communicating the WUS. In connected mode, instead of constantly monitoring the control channel, the device may be configured to monitor the WUS prior to any potential subsequent control channel or prior to the ON-period of a DRX-cycle. Typically, a modulation scheme of the WUS is comparably simple. A simple waveform results in a WUS that may be detected comparably with a lower device processing complexity than other signals such as data reception. In particular, a sequence-based WUS may be used. The waveform of such a sequence-based WUS may be detectable using time-domain processing. Synchronization (e.g., in time domain) between a transmitter and a receiver may not be required or can be coarse. Yet, in other examples, synchronization may be required, e.g., if the WUS is transmitted using a connection control channel that uses, e.g., Orthogonal Frequency Division Multiplex (OFDM) modulation. Then, frequency-domain processing is required, including demodulation and decoding. In further detail, reception of a WUS may, in some examples, help to avoid blind decoding of a control channel during a PO. Since typically such blind decoding is comparably energy inefficient, thereby, power consumption can be reduced by using WUSs. This is explained in greater detail hereinafter: For example, in the 3GPP scenario, during POs, the wireless communication device is expected to blind decode the control channel, specifically the Physical Downlink Control Channel (PDCCH). The blind decoding during the POs is for a paging radio NW temporary identifier (P-RNTI) as paging identity, typically transmitted in as a so-called paging indicator. If presence of a paging indicator including the P-RNTI is detected, the wireless communication device continues to decode a subsequent data shared channel (e.g., Physical Downlink Shared Channel, PDSCH) for a paging message. The blind decoding is comparably energy inefficient and can be conditionally triggered by means of the WUS operation. i.e., by a preceding WUS. In other examples, the WUS can also be transmitted on a control channel, e.g., PDCCH. This is sometimes referred to as PDCCH-based WUS.

Figure 3:
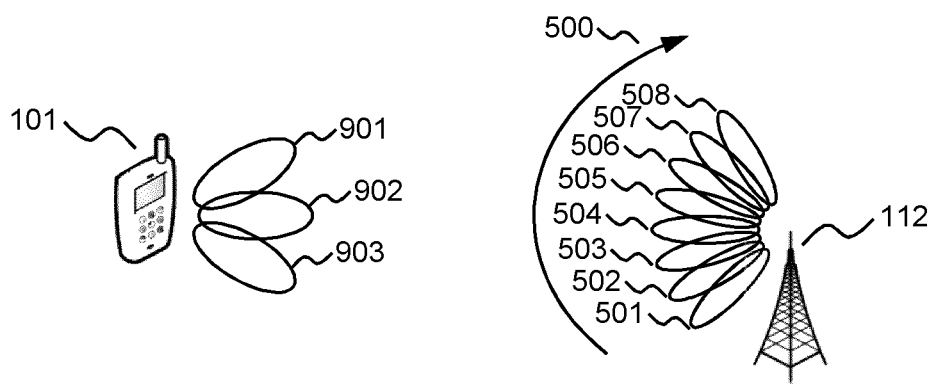
FIG. 3 schematically illustrates, in accordance with an example, a transmit beam sweep of a BS of the wireless communications network and receive beams of a wireless communication device.

FIG. 3 schematically illustrates, in accordance with an example, a transmit beam sweep 500 of a BS 112 of the wireless communications network 100 and receive beams 901-903 of the wireless communication device 101.

While in FIG. 3 transmit beams 501-508 at the BS 112 and receive beams 901-903 at the device 101 are shown, it is possible that the device 101 uses transmit beams and the BS 112 uses receive beams, as well.

In the various examples described herein, signals may be transmitted on the wireless link 114 in a millimeter wave frequency range from 24.25 GHz to 52.6 GHz known as FR2 and having relatively high attenuation. This power loss is at least partly overcome by beamforming.

"Beamforming" or spatial filtering as used herein may refer to a signal processing technique used in connection with antenna arrays for directional signal transmission or reception, by means of controlling the phase and amplitude of the signal at each antenna in order to create a pattern of constructive and destructive interference in the wavefront.

BSs may employ RF-based analog beamforming. If so, only one beam can be formed per set of antenna elements at a time, and comprehensive cell coverage requires a multi-beam operation such as beam sweeping, in which a burst of multiple beams is periodically transmitted, each beam having a predefined direction.

FIG. 3 shows an exemplary transmit beam sweep 500 of the BS 112 that comprises multiple transmit beams 501-508. An illustrative subset 503-506 of the multiple transmit beams 501-508 of the BS 112 as well as receive beams 901-903 of the wireless communication device 101 will be used to illustrate various examples in subsequent FIGs.

Figure 4:
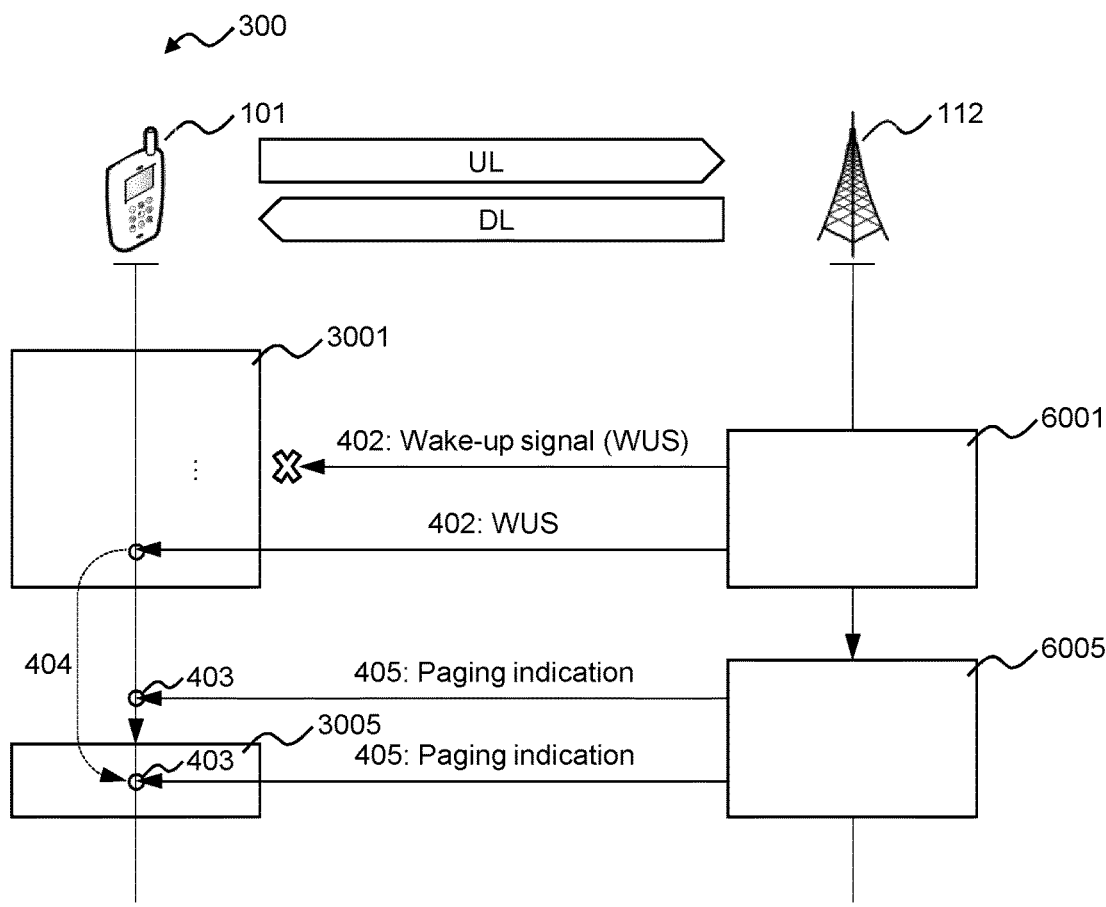
FIG. 4 schematically illustrates, in accordance with an example, a method of operating a wireless communication device.

FIG. 4 schematically illustrates, in accordance with an example, a method 300 of operating the wireless communication device 101, the wireless communication device 101, and a BS 112.

The wireless communication device 101 is configured for communication with a wireless communications network 100 via a wireless link 114 (see FIG. 1). The BS 112 can be part of a wireless communications network 100, in particular a cellular NW 100 (see FIG. 1), and is configured for communication with the wireless communication device 101 via the wireless link 114. As illustrated in between the nodes 101, 112, communication on the wireless link 114 may be directed uplink (UL) towards the BS 112, or downlink (DL) towards the wireless communication device 101.

The method 300 comprises a step of monitoring 3001 for at least one WUS 402 in the disconnected operational mode 202, 203 prior to a PO 403 associated with the wireless communication device 101. The wireless communication device 101 may transition its wireless interface from the inactive state to the active state, in preparation of the PO 403. This can include, e.g., switching on a high-frequency clock, powering up an analog frontend, etc. This transition can be in accordance with a DRX cycle associated with the operation in the respective disconnected operational mode 202, 203.

Monitoring 3001 for the at least one WUS 402 can correspond to attempting to receive the at least one WUS 402. This can include time-domain signal processing. For instance, based on On-Off-Keying or Frequency Shift Keying demodulation and comparison of the demodulation result with a reference sequence, it is possible to detect the WUS 402 on the wireless link 114.

The at least one WUS 402, if any, is transmitted 6001 by the BS 112 prior to one or more POs 403, when the wireless communication device 101 is in a disconnected operational mode 202, 203. Sometimes, the WUS 402 is shared by multiple wireless communication devices of a WUS group: then, the WUS 402 is transmitted if the device 101 is a member of the WUS group of wireless communication devices to be awakened.

Responsive to transmitting 6001 the at least one WUS 402, the BS 112 further transmits 6005 a paging indication 405 in the PO 403.

Based on WUS operation, wireless communication devices 101 associated with a same PO 403 may be triggered as needed to learn whether they will be paged or are likely to be paged. WUSs 402 are identical for a group of devices listening to the same PO 403, meaning that if one device 101 of the group is paged, all devices 101 of that group will be awaken. This implies that a device 101 that is woken up by a WUS 402 may not actually be paged. To find out, the wireless communication device 101 attempts to receive (monitors for) the paging signal, upon detection of the WUS. This comprises reading the PDCCH of the PO 403 for the paging indication 405, and subsequently reading the PDSCH for its UE identity in the corresponding RRC paging message.

Conventionally, the wireless communication device 101 would not know yet the particular BS transmit beam, say transmit beam 501 out of multiple BS transmit beams 501-508, to listen to as well as the precise "location" of the paging indication 405 within the NR frame structure when transitioning from the inactive state to the active state in preparation of the PO. The wireless communication device 101 may thus determine which BS transmit beam 501-508 to listen to before being able to read the actual paging signal 405, 406.

Sometimes, this beam establishment may be more power consuming that the actual reading of the paging information. The techniques described herein facilitate reducing the power consumption of the beam establishment.

According to the various examples described herein, after waking up from the WUS, the wireless communication device 101 selects a spatial filter for receiving the BS transmit beam 501 on which it received the WUS for the paging signal, too. In addition, the wireless communication device 101 also knows where in the NR frame structure to listen to the paging, because the at least one WUS 402 is indicative 404 of at least one time-frequency resource element of the PO 403 transmitted with the same transmit beam 501 as for the WUS. The PO 403 is allocated to the paging indication 405.

Thus, the method 300 further comprises a step of monitoring 3005 for a paging indication 405 in the PO 403 in response to detection of the at least one WUS 402. The wireless communication device attempts to receive the paging indication 405. This can include blind decoding of the PDCCH.

As a result of making use of the indication provided by the at least one WUS 402, the wireless communication device 101 does not have to learn which PO 403 to listen to, as the paging indication 405 will be available at the indicated 404 at least one time-frequency resource element of the PO 403. As learning which PO 403 to listen to becomes obsolete, a power consumption of the wireless communication device 101 is reduced.

Figure 5:
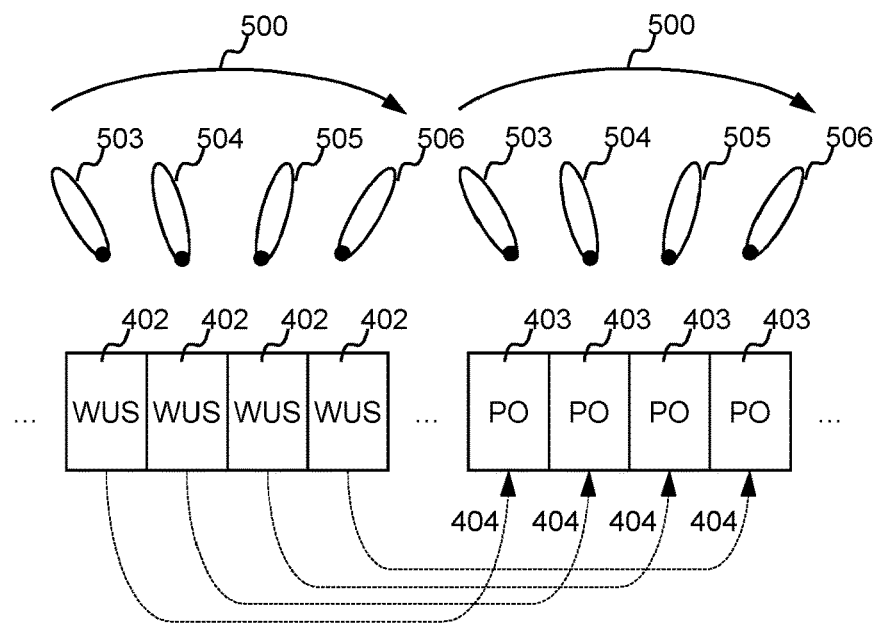
FIG. 5 schematically illustrates, in accordance with various examples, a beam-swept burst of multiple WUSs respectively being indicative of a corresponding PO in a beam-swept burst of multiple POs.

FIG. 5 schematically illustrates, in accordance with various examples, a beam-swept burst of multiple WUSs 402 respectively being indicative of a corresponding PO 403 in a beam-swept burst of multiple POs 403.

In a beam sweeping operation in accordance with FIG. 3, the at least one WUS 402 may be included in a beam-swept burst of multiple WUSs 402, and the paging indication 405 may be included in a beam-swept burst of multiple POs 403.

In the example of FIG. 5, each of the multiple WUSs 402 relates to one of the exemplary multiple transmit beams 503-506 of the BS 112, and similarly each of the POs 403 relates to one of the multiple transmit beams 503-506 of the BS 112.

A respective association between the WUS 402 of the burst 500 and the POs 403 is illustrated in FIG. 5 by the arrows. In principle, this association can be diverse, the main restriction being that normally all WUS 402 are indicative of at least one PO 403, and that normally all POs 403 are referred to by at least one WUS 402. In particular, the mapping between WUS 402 and POs 403 need not be one-to-one, nor can wireless communication devices assume a priori that indices of WUS 402 are related to indices of POs 403 in any particular way. The design of the WUS uses this degree of freedom to, e.g., maximize power saving of the wireless communication devices 101.

As indicated by the arrows in FIG. 5, each of the multiple beam-swept WUSs 402 is indicative 404 of a respective one of the beam-swept multiple POs 403, and more particularly of at least one time-frequency resource element of the PO 403. In other words, the at least one WUS 402 and the paging indication 405 may be transmitted using the same downlink transmit beam 503-506.

As a result of relating WUSs 402 and time-frequency resource elements of corresponding POs 403 of the same BS transmit beams 503-506, the wireless communication device 101 does not have to separately learn which PO 403 to listen to, as the paging indication 405 will be available at the indicated 404 at least one time-frequency resource element of the PO 403 of the same beam 503-506 that was used to wake up the wireless communication device 101 being paged. As learning which PO 403 to listen to within the same beam 503-506 becomes obsolete, a power consumption of the wireless communication device 101 is reduced. For instance, the wireless communication device 101 may skip monitoring for the SSBs prior to the POs 403.

In accordance with FIG. 5, the WUS 402 may also be indicative 404 of an index of a frame element of transmission protocol implemented by the communications network 100, the frame element comprising the at least one time-frequency resource element of the PO 403.

In such cases, each WUS 402 included in a beam-swept burst of multiple WUSs 402 may be identified by a periodically recurring index, which may in turn indicate 404 an index of a frame element of transmission protocol comprising the at least one time-frequency resource element of the PO 403. In other words, a $k^{th}$ transmitted WUS 402 included in a beam-swept burst of multiple WUSs 402 may be indicative of a k$^{th}$ PDCCH monitoring occasion of a PO 403 included in a beam-swept burst of multiple POs 403.

As a result, a correspondence of WUSs 402 and time-frequency resource elements of corresponding POs 403 is established within respective BS transmit beams 503-506.

Figure 6:
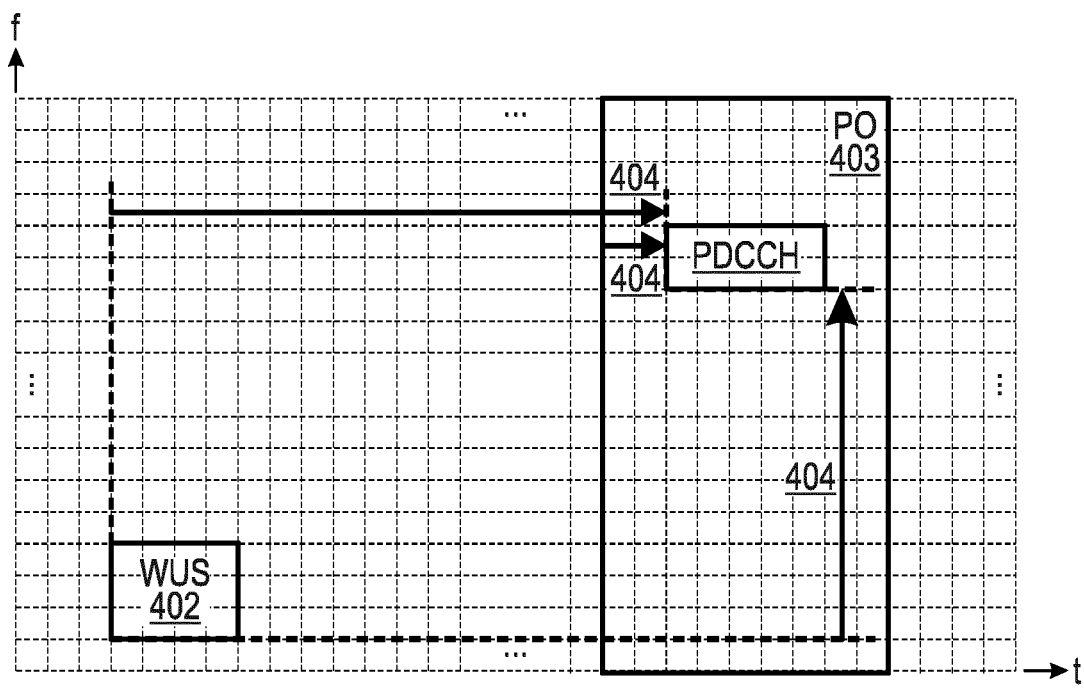
FIG. 6 schematically illustrates, in accordance with various examples, relative indications of a frame element in a time-frequency resource grid.

FIG. 6 schematically illustrates, in accordance with various examples, relative indications 404 of a frame element in a time-frequency resource grid.

As already mentioned in connection with FIG. 1, the time-frequency resource grid is implemented by the wireless link 114. The exemplary time-frequency resource grid in FIG. 6 extends (vertically) in a frequency dimension and (horizontally) in a time dimension. The OFDM subcarriers (in frequency domain) and the symbols (in time domain) then define time-frequency resource elements (i.e., the small boxes) of the time-frequency resource grid. Thereby, a protocol time base is defined. Different time-frequency resource elements can be allocated to different logical channels or reference signals of the wireless link 114.

As an example, FIG. 6 indicates time-frequency resource elements being allocated to a WUS 402. This exemplary and non-binding WUS 402 is for coherent demodulation as it is part of the NR frame structure.

FIG. 6 further indicates time-frequency resource elements being allocated to a PO 403, and at least one time-frequency resource element of this PO 403 being allocated to a paging indication 405, or more specifically, to a PDCCH that may comprise the paging indication 405.

The WUS 402 may relatively indicate 404 the at least one time-frequency resource element with respect to a reference. This reference may comprise at least one of a timing of the at least one WUS 402, a frequency of the at least one WUS 402, or a timing of the PO 403.

A "timing" as used herein may refer to the previously mentioned protocol time base (see section relating to FIG. 1) and in particular to time boundaries of the frames and subframes of the time-frequency resource grid implemented by the wireless link 114. The timing may be defined with respect to a symbol time duration.

A "frequency" as used herein may refer to frequency boundaries of elements of the time-frequency resource grid, and in particular to indices for frequency values of OFDM subcarriers.

In FIG. 6, a timing of the at least one WUS 402 and a frequency of the at least one WUS 402 are respectively indicated by dashed vertical and horizontal lines extending from the time-frequency resource elements allocated to the WUS 402. Corresponding horizontal and vertical arrows relatively indicate 404 the at least one time-frequency resource element with respect to these references. These relative indicators may be time and/or frequency offsets relative to the chosen reference. Alternatively, these relative indicators may be slot and/or physical resource block (PRB) indices relative to the chosen reference, wherein a slot may comprise 14 OFDM symbols and a PRB may comprise 12 OFDM subcarriers, for example.

Similar relative indications 404 of the at least one time-frequency resource element may be provided based on references which do not form part of the NR frame structure, such as WUS for non-coherent demodulation, provided that a form of synchronization to the NR frame structure is accomplished.

FIG. 6 further indicates that the timing of the PO 403 may also serve as a reference for a relative indication 404 of the at least one time-frequency resource element. In accordance with this example, a form of synchronization to the NR frame structure needs to be accomplished, and the PO 403 needs to be determined so that its timing may serve as the reference.

Additionally, the WUS 402 may comprise an explicit indicator 404 of the at least one time-frequency resource element or comprise a codebook index 404 associated with a codebook of candidate time-frequency resource elements. Possible explicit indicators have already been mentioned above, while implicit indicators become explicit via a codebook lookup which may be pre-agreed in a standard.

As a result, a flexible correspondence of WUSs 402 and time-frequency resource elements of corresponding POs 403 is established.

Figure 7:
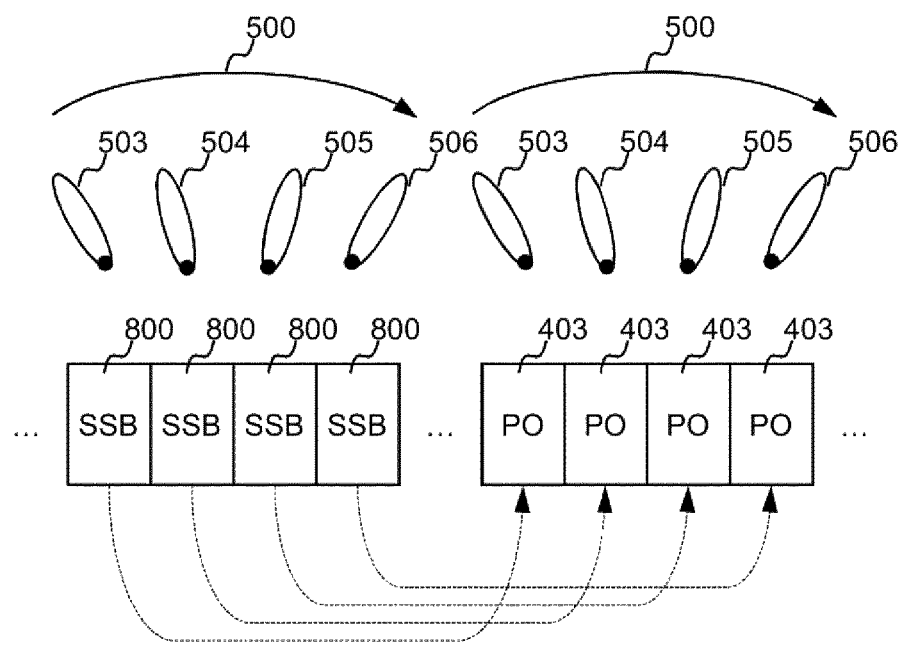
FIG. 7 schematically illustrates, in accordance with various examples, a beam-swept burst of multiple synchronization signal blocks respectively being indicative of a corresponding PO in a beam-swept burst of multiple POs.

FIG. 7 schematically illustrates, in accordance with various examples, a beam-swept burst of multiple synchronization signal blocks (SSB) 800 respectively being indicative of a corresponding PO 403 in a beam-swept burst of multiple POs 403.

An SSB 800 can, e.g., include a primary synchronization signal (SS) and a secondary SS, and a physical broadcast channel (PBCH). The primary SS and the secondary SS implement reference signals (RS). The primary SS and the secondary SS are for the wireless communication device 101 to lock into the correct frequency and time.

Conventionally, the wireless communication device 101 needs to listen to one or more of burst of SSBs 800 to acquire time-frequency synchronization and determine a high-quality beam pair, which includes finding a DL transmit beam 503-506. Therefore, an FR2 device 101 in prior art might need to wake up tens or hundreds of ms before a burst of POs 403 is expected, thereby increasing power consumption.

The wireless communication device knows the actual number of beams only by accessing ssb_PositionsInBurst in SIB1. For this the device 101 needs to decode a master information block (MIB) in PBCH and SIB1 in PDSCH.

The device 101 then listens to PDCCH monitoring occasions of a PO 403 included in the found transmit beam 503-506.

This need for listening to SSBs 800 is eliminated by enabling the device 101 to read the paging information anyway, as has been described in more detail in connection with FIG. 4. An alternative solution (not shown) is to skip listening to SSBs 800 and to directly proceed with paging and listening to all PDCCH monitoring occasions in the PO 403.

In accordance with the example of FIG. 7, SSBs 800 can be repeatedly or periodically transmitted by the BS 112, e.g., on predefined time-frequency resources of the time-frequency resource grid. It is possible that a burst of SSBs 800 is transmitted, employing a beam sweep 500 including the DL transmit beams 503-506, see FIG. 7. Similarly, it is possible that a burst of multiple POs 403 is transmitted, employing a same beam sweep 500 including the DL transmit beams 503-506, see FIG. 7. Thereby, spatial coverage can be increased.

Typically, the burst of multiple SSBs 800 may have a duration of, e.g., up to 5 ms. The periodicity with which the bursts are transmitted may be 20 ms to 160 ms.

The SSBs 800 transmitted on different DL transmit beams 503-506 can have a different SSB time index. Thus, different SSBs 800—i.e., having different SSB time indices—are associated with different POs 403.

As indicated by the arrows in FIG. 7, each of the multiple beam-swept SSBs 800 may be indicative of a respective one of the beam-swept multiple POs 403.

As a result of relating SSBs 800 and corresponding POs 403 of a same BS transmit beam 503-506, the device 101 does not have to learn which PO 403 to listen to, as the paging indication 405 will be available at the PO 403 of the same beam 503-506 indicated by a respective SSB time index. As learning which PO 403 to listen to within the same beam 503-506 becomes obsolete, a power consumption of the device 101 is reduced.

Figure 8:
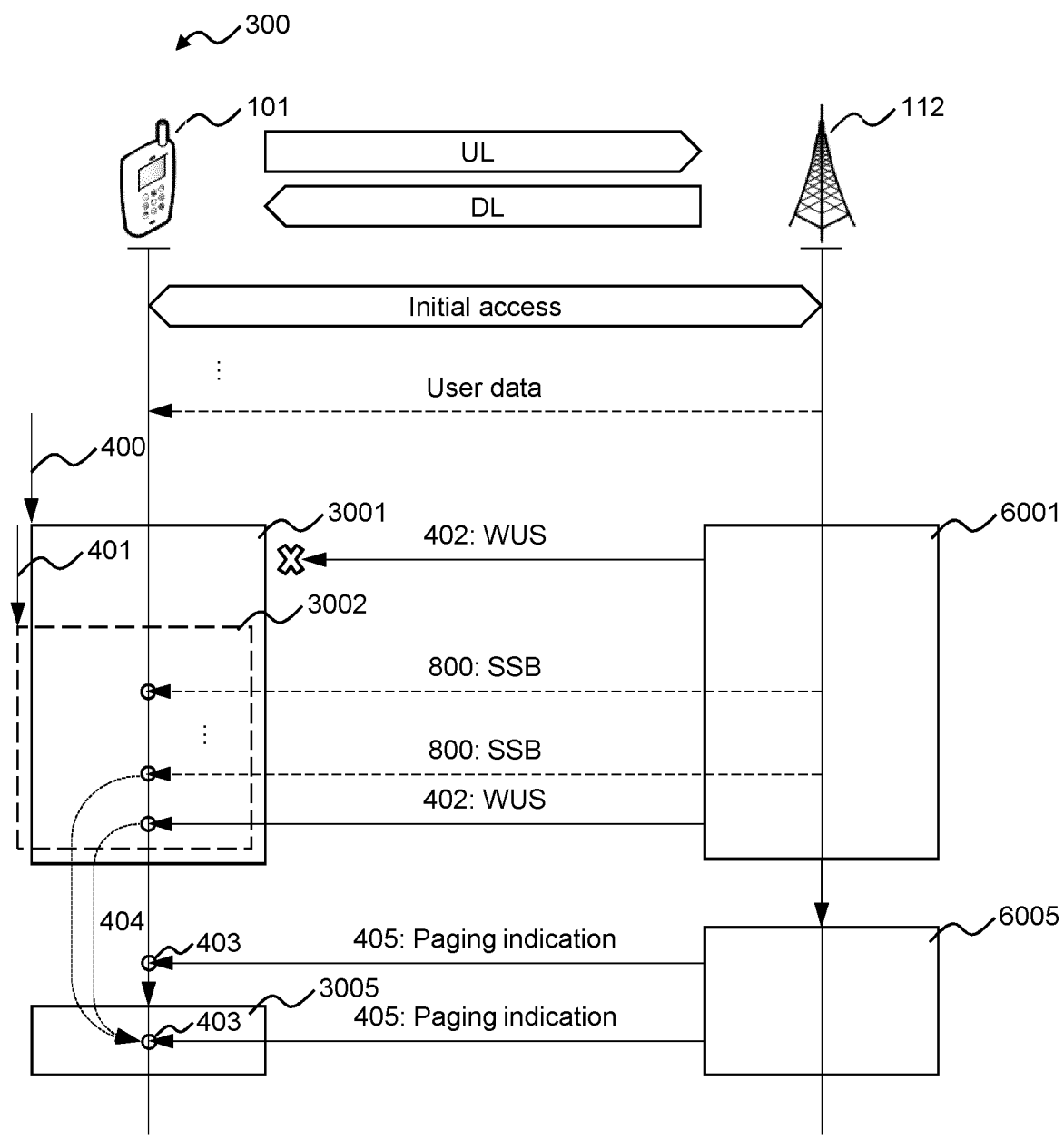
FIG. 8 schematically illustrates, in accordance with another example, a method of operating a wireless communication device.

FIG. 8 schematically illustrates, in accordance with another example, a method 300 of operating a wireless communication device 101.

The example of FIG. 8 illustrates a fallback to a known paging technique whenever the step of monitoring 3001 for at least one WUS 402 fails.

After an initial access and possibly some transfer of user data has taken place, the wireless communication device 101 enters a disconnected operational mode 202, 203 in which a monitoring 3001 for at least one WUS 402 is performed. The disconnected mode 202, 203 is also associated with paging operation.

In particular, the device 101 may enter an idle mode 202 after expiry of an inactivity timer 400 that is reset upon each transfer of user data. When operating in the idle mode 202, the device 101 is configured to monitor for the at least one WUS 402.

In particular, a detection of the at least one WUS 402 may be deemed to have failed after expiry of an inactivity timer 401 that is reset upon each reception of a WUS 402 or in accordance with a DRX cycle, e.g., when not detecting the WUS 402 for a certain time period after transitioning the wireless interface from an inactive state to an active state prior to one or more POs 403.

For such cases, the method 300 may further comprise a step of monitoring 3002 for a synchronization signal block, SSB, 800 broadcasted by the wireless communications network 100 prior to the PO 403, in response to a failed detection of the at least one WUS 402.

Conventionally, the wireless communication device 101 would have to listen to SSBs 800 to find a DL transmit beam 503-506, synchronize to the NR frame structure and then listen to PDCCH monitoring occasions of a PO 403 included in the found transmit beam 503-506.

However, in accordance with the example of FIG. 7, each of the multiple beam-swept SSBs 800 may be indicative of a respective one of the beam-swept multiple POs 403.

So the wireless communication device learns which PO 403 to listen to from successfully receiving an SSB part of an SS burst.

If so, the method 300 may further comprise skipping the step of monitoring 3002 for the synchronization signal block 800 broadcasted by the wireless communications network 100 prior to the PO 403, in response to the detection of the at least one WUS 402.

As a result, learning which PO 403 to listen to becomes obsolete, a power consumption of the wireless communication device 101 is reduced.

As a further result, a fallback is available whenever and as long as the step of monitoring 3001 for at least one WUS 402 fails.

Figure 9:
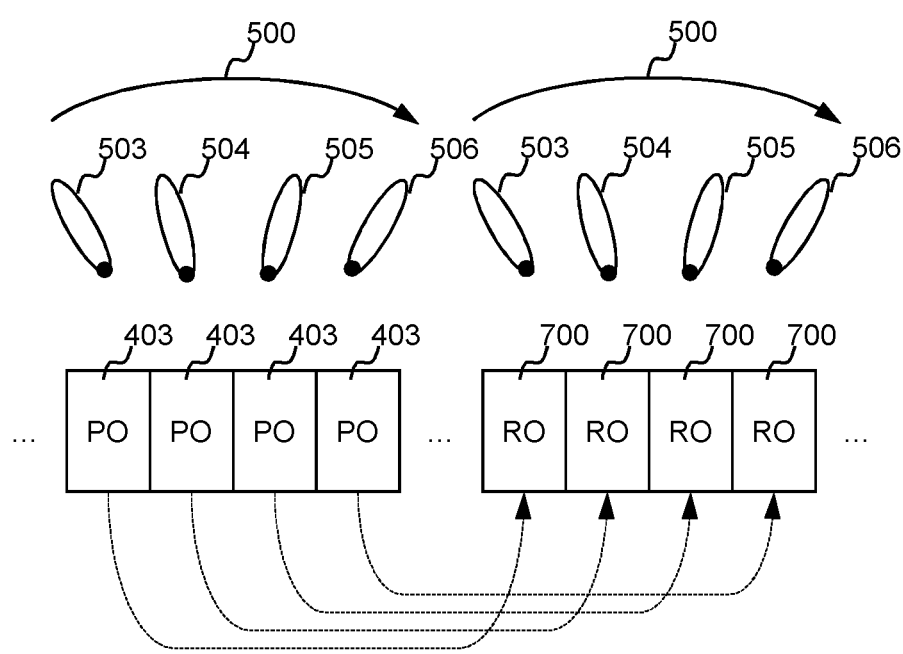
FIG. 9 schematically illustrates, in accordance with various examples, a beam-swept burst of multiple POs respectively being indicative of a corresponding random-access occasion (RO) in a beam-swept burst of multiple random access occasions.

FIG. 9 schematically illustrates, in accordance with various examples, a beam-swept burst of multiple POs 403 respectively being indicative of a corresponding random access occasion 700 in a beam-swept burst of multiple random access occasions 700.

In a beam sweeping operation in accordance with FIG. 3, the paging indication 405 may be included in a beam-swept burst of multiple POs 403.

In the example of FIG. 9, each of the multiple POs 403 relates to one of the exemplary multiple transmit beams 503-506 of the BS 112, and similarly each of the multiple random access occasions 700 relates to one of the multiple transmit beams 503-506 of the BS 112.

As indicated by the arrows in FIG. 9, each of the multiple beam-swept POs 403 is indicative of a respective one of the beam-swept multiple random access occasions 700. In other words, the paging indication 405 and the corresponding random access occasion 700 may be transmitted using the same downlink transmit beam 503-506.

As a result of relating POs 403 and random access occasions 700 within respective BS transmit beams 503-506, the wireless communication device 101 does not have to learn which random access occasion 700 to use for a random access 407, as the random access occasion 700 is implied. This further reduces a power consumption of the wireless communication device 101.

Each of the multiple POs 403 may also be indicative of an index of a frame element of transmission protocol implemented by the communications network 100, the frame element comprising the corresponding random access occasion 700.

In such cases, each PO 403 included in a beam-swept burst of multiple POs 403 may be identified by a periodically recurring index, which may in turn indicate an index of a frame element comprising the corresponding random access occasion 700. In other words, a $k^{th}$ transmitted PO 403 included in a beam-swept burst of multiple POs 403 may be indicative of a $k^{th}$ random access occasion 700 included in a beam-swept burst of random access occasions 700.

As a result, a straightforward correspondence of POs 403 and corresponding random access occasions 700 is established within respective BS transmit beams 503-506.

Figure 10:
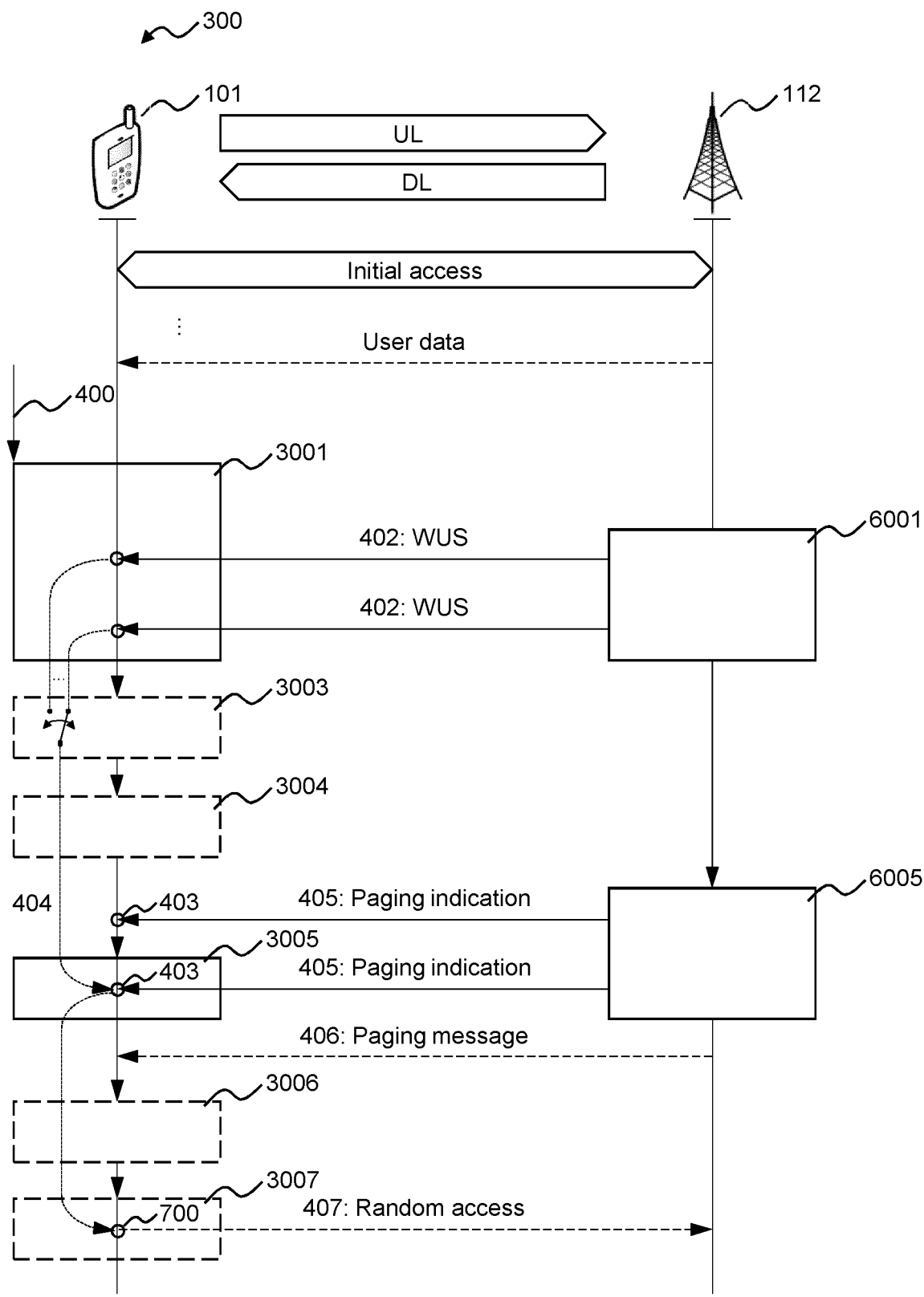
FIG. 10 schematically illustrates, in accordance with yet another example, a method of operating a wireless communication device.

FIG. 10 schematically illustrates, in accordance with yet another example, a method 300 of operating a wireless communication device 101.

An initial access and a possible transfer of user data may have taken place as described in connection with FIG. 8 before the wireless communication device 101 enters a disconnected operational mode 202, 203 in which a monitoring 3001 for at least one WUS 402 is performed.

When monitoring 3001 for at least one WUS 402 in the disconnected operational mode 202, 203 prior to a PO 403, chances are that more than one, i.e., at least two, WUSs 402 of the beam-swept burst of multiple WUSs 402 are detected by the wireless communication device 101.

For such cases, the method 300 may further comprise a step of selecting 3003 one of the at least two WUSs 402 in response to the detection of at least two WUSs 402 of the beam-swept burst of multiple WUSs 402.

If selected 3003, the subsequent monitoring 3005 for the paging indication 405 is then performed at the at least one time-frequency resource element of the PO 403 indicated 404 by the selected WUS 402.

The at least two WUSs 402 transmitted using different BS transmit beams 501-508 will typically have different signal amplitudes at the location of the wireless communication device 101. As a result of a selection 3003 of one of the at least two WUSs 402, e.g., the strongest one of the at least two WUSs 402, the detection reliability of the paging signal can be increased. This is because the signal propagation for the WUS 402 having a strong signal amplitude is likely to correspond to the signal propagation of the paging signal transmitted using the same BS transmit beam 501-508.

Before being able to read the actual paging signal, the wireless communication device 101 may establish 1) which BS transmit beam 501-508 to listen to,
2) which device receive beam 901-903 to use, and
3) time-frequency synchronization with the NR frame structure.

As for establishment of which of the BS transmit beam 501-508 to listen to, after waking up from WUS, the wireless communication device 101 can assume that the BS transmit beam 501 via which it just received WUS is good enough to receive paging on, as already mentioned in connection with FIG. 4.

As for establishment of the device receive beam 901-903 to use, when the wireless communication device 101 listens for the WUS, the method 300 may further comprise a step of determining 3004 a receive beam 902 based on a receive property of the WUS 402.

For example, the receive property of the WUS 402 may be a receive power or an analog or digital figure of merit of the WUS 402, such as a signal to noise ratio (SNR) or a bit error ratio (BER).

If determined 3004, the subsequent monitoring 3005 for the PO 403 then uses the determined receive beam 902.

As a result, the wireless communication device 101 knows right after wake-up which receive beam 902 it should use when reading the paging information 405, 406.

As for establishment of time-frequency synchronization with the NR frame structure, the method 300 may further comprise synchronizing with the wireless communications network 100 based on the detection of the WUS 402.

The detection of the WUS 402 may take advantage of the existing coherent receiver of the wireless communication device 101, which involves a local oscillator (LO) at the receiver. This implies that the WUS 402 may be integrated in the time-frequency resource grid implemented by the wireless link 114. In other words, the WUS 402 is a part of the NR frame structure, in particular an FR2 NR signal, and may thus appear at certain points in time only.

Alternatively, the detection of the WUS 402 may be based on very low power receivers for non-coherent demodulation, such as, for example, direct detection (DD) of On-Off Keying (OOK) modulated WUSs 402. As such, these receivers may be provided in addition to the coherent receiver of the wireless communication device 101 and may be operated in an always-on manner, having no timing constraint.

Accordingly, the monitoring 3001 for the WUS 402 may comprise non-coherent demodulation of the WUS 402 or coherent demodulation of the WUS 402.

As a result, monitoring of WUSs 402 may be implemented in dependence of an application or a required level of mobility.

In accordance with the example of FIG. 9, the method 300 may further comprise a step of determining 3006 at least one further time-frequency resource element of a random-access occasion 700 based on the at least one time-frequency resource element of the PO 403, and accessing 3007 the random-access occasion 700 responsive to a detection of the paging indication 405.

A "random access occasion" (RO) as used herein may refer to a frame element of the time frequency resource grid implemented by the wireless link 114 and comprising at least one time-frequency resource element. Wireless communication devices 101 may attempt a random access by transmitting, uplink to the serving BS 112, a Random Access Preamble in a random access occasion.

Different random-access occasions 700 are associated with different BS transmit beams 503-506. Thus, by selecting the appropriate random-access occasion 700, the wireless communication device 101 can indicate—according to reference implementations—which BS transmit beam 503-506 was best.

As a result, establishment of an appropriate beam pair during random access is facilitated.

Typically, the BS 112 monitors the random-access occasions 700 using BS receive beams, which may correspond to the BS transmit beams 503-506 used for transmitting the SSBs 800, as illustrated in FIG. 9. For example, the same spatial filter may be used. It would be possible to use the same antenna weights or a scaled version of these antenna weights.

Figure 11:
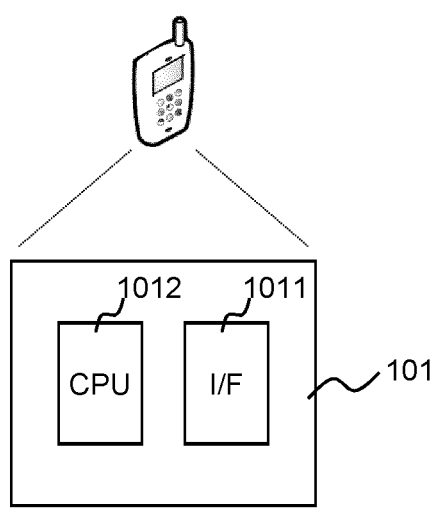
FIG. 11 schematically illustrates, in accordance with an example, a wireless communication device.

FIG. 11 schematically illustrates, in accordance with an example, a wireless communication device 101.

The wireless communication device 101 is configured for communication with a wireless communications network 100 in a disconnected operational mode 202, 203.

The wireless communication device 101 may be configured for performing the method 300 of various embodiments. As a result, the technical effects and advantages described above in relation with the method 300 equally apply to the wireless communication device 101 having corresponding features.

The wireless communication device 101 comprises a wireless interface 1011 that is configured to access and control multiple antennas.

The wireless communication device 101 further comprises a processing unit 1012 that can load and subsequently execute program code that is stored in a memory. Executing the program code causes the processor to perform techniques as described herein, e.g.: communicating with a wireless communication network 100 on a wireless link 114; performing beam sweeps; monitoring for reference signals, i.e., attempting to receive reference signals; selecting one or more random-access occasions 700; etc.

The wireless communication device 101 is configured for monitoring 3001 for at least one WUS 402 in the disconnected operational mode 202, 203 prior to a PO 403; and attempting to receive (monitoring) 3005 for a paging indication 405 in the PO 403 in response to detection of the at least one WUS 402. The at least one WUS 402 is indicative 404 of at least one time-frequency resource element of the PO 403 allocated to the paging indication 405.

Figure 12:
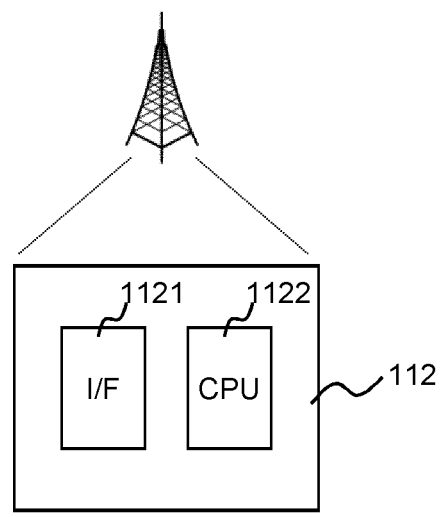
FIG. 12 schematically illustrates, in accordance with an example, a base station.

FIG. 12 schematically illustrates, in accordance with an example, a BS 112.

The BS 112 is configured for communication with a wireless communication device 101 in a wireless communications network 100 in a disconnected operational mode 202, 203.

The BS 112 comprises a wireless interface 1121 that is configured to access and control multiple antennas.

The BS 112 further comprises a processing unit 1122 that can load and subsequently execute program code that is stored in a memory. Executing the program code causes the processor to perform techniques as described herein, e.g.: communicating with a wireless communication device 101 on a wireless link 114; performing beam sweeps; transmitting signals such as reference signals; scheduling signals for transmission on the wireless link; participating in initial access of devices 101; monitoring for devices 101 accessing random-access occasions 700; etc.

The BS 112 is configured for transmitting 6001 at least one WUS 402 in the disconnected operational mode 202, 203 prior to a PO 403; and transmitting 6005 a paging indication 405 in the PO 403 in response to transmitting the at least one WUS 402. The at least one WUS 402 is indicative 404 of at least one time-frequency resource element of the PO 403 allocated to the paging indication 405.

As a general rule, the techniques described herein could be used for various types of wireless communications networks, e.g., also for peer-to-peer communication, etc. For sake of simplicity, however, hereinafter, various techniques will be described in the context of a wireless communications network that is implemented by a BS of a cellular NW and a wireless communication device.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

Summarizing, at least the following examples have been described above:

EXAMPLE 1. A method (300) of operating a wireless communication device (101) configured for communication with a wireless communications network (100) in a disconnected operational mode (202, 203), the method (300) comprising:
  monitoring (3001) for at least one wake-up signal (402) in the disconnected operational mode (202, 203) prior to a paging occasion (403); and
  responsive to detection of the at least one wake-up signal (402), monitoring (3005) for a paging indication (405) in the paging occasion (403);
  the at least one wake-up signal (402) being indicative (404) of at least one time-frequency resource element of the paging occasion (403) allocated to the paging indication (405).

EXAMPLE 2. The method (300) of EXAMPLE 1,
  wherein the at least one wake-up signal (402) is included in a beam-swept burst of multiple wake-up signals (402),
  wherein the paging indication (405) is included in a beam-swept burst of multiple paging occasions (403),
  wherein the at least one wake-up signal (402) and the paging indication (405) are transmitted using the same downlink transmit beam (501-508).

EXAMPLE 3. A method (300) of operating a wireless communication device (101) configured for communication with a wireless communications network (100) in a disconnected operational mode (202, 203), the method (300) comprising:
  monitoring (3001) for at least one wake-up signal (402) included in a beam-swept burst of multiple wake-up signals (402) in the disconnected operational mode (202, 203) prior to a paging occasion (403) included in a beam swept burst of multiple paging occasions (403),
  wherein the at least one wake-up signal (402) enables the wireless communication device (101) to synchronize with the wireless communications network (100), and
  wherein the at least one wake-up signal (402) is indicative (404) of at least one time-frequency resource element of the paging occasion (403) allocated to a paging indication (405) that is transmitted using the same downlink transmit beam as the at least one wake-up signal (402); and
  responsive to detection of the at least one wake-up signal (402), monitoring (3005) the at least one time-frequency resource element of the downlink transmit beam where the wake-up signal (402) was detected for a paging indication (405) based on the detected at least one wake-up signal (402), wherein the detected at least one wake-up signal (402) enables the wireless communication device (101) to receive the paging indication (405) without first monitoring, in particular reading, a synchronization signal block, in particular a burst of multiple synchronization signal blocks.

EXAMPLE 4. The method (300) of operating the wireless communication device (101) of EXAMPLE 1,
  wherein synchronization requirements for detecting the wake-up signal (402) are lighter than for detecting the paging indication (405).

EXAMPLE 5. The method (300) of operating the wireless communication device (101) of EXAMPLE 3 or 4, wherein the method further comprises synchronizing with the wireless communications network (100) based on the detection of the wake-up signal (402).

EXAMPLE 6. The method (300) of operating a wireless communication device (101) of any one of EXAMPLEs 3 to 5,
  wherein the wake-up signal is detectable by a lower power receiver.

EXAMPLE 7. The method (300) of any one of EXAMPLEs 2 to 6, further comprising:
  responsive to the detection of at least two wake-up signals (402) of the beam-swept burst of multiple wake-up signals (402), selecting (3003) one of the at least two wake-up signals (402) and monitoring (303) for the paging indication (405) at the at least one time-frequency resource element of the paging occasion (403) indicated (404) by the selected wake-up signal (402).

EXAMPLE 8. The method (300) of any one of the preceding EXAMPLEs,
  the wake-up signal (402) relatively indicating (404) the at least one time-frequency resource element with respect to a reference.

EXAMPLE 9. The method (300) of EXAMPLE 8,
  wherein the reference comprises at least one of a timing of the at least one wake-up signal (402), a frequency of the at least one wake-up signal (402), or a timing of the paging occasion (403).

EXAMPLE 10. The method (300) of any one of the preceding EXAMPLEs,
  the wake-up signal (402) being indicative (404) of an index of a frame element of transmission protocol implemented by the wireless communications network (100), the frame element comprising the at least one time-frequency resource element of the paging occasion (403).

EXAMPLE 11. The method (300) of any one of the preceding EXAMPLEs,
  the wake-up signal (402) comprising an explicit indicator (404) of the at least one time-frequency resource element or comprising a codebook index (404) associated with a codebook of candidate time-frequency resource elements.

EXAMPLE 12. The method (300) of any one of the preceding EXAMPLEs, further comprising
  determining (3006) at least one further time-frequency resource element of a random-access occasion (700), based on the at least one time-frequency resource element of the paging occasion (403), and
  responsive to a detection of the paging indication (405), accessing (3007) the random-access occasion (700).

EXAMPLE 13. The method (300) of any one of the preceding EXAMPLEs, further comprising:

responsive to a failed detection of the at least one wake-up signal (402), monitoring (3002) for a synchronization signal block, SSB (800), broadcasted by the wireless communications network (100) prior to the paging occasion (403), responsive to the detection of the at least one wake-up signal (402), skipping the monitoring (3002) for the synchronization signal block (800) broadcasted by the wireless communications network (100) prior to the paging occasion (403).

EXAMPLE 14. The method (300) of any one of the preceding EXAMPLEs, further comprising:

based on a receive property of the wake-up signal (402), determining (3004) a receive beam (902),
wherein the monitoring (3005) for the paging occasion (403) is using the receive beam (902).

EXAMPLE 15. The method (300) of any one of the preceding EXAMPLEs, further comprising:

synchronizing with the wireless communications network (100) based on the detection of the wake-up signal (402).

EXAMPLE 16. The method (300) of any one of the preceding EXAMPLEs, the monitoring (3005) for the wake-up signal (402) comprising non-coherent demodulation of the wake-up signal (402) or coherent demodulation of the wake-up signal (402).

EXAMPLE 17. A wireless communication device (101) for communication with a wireless communications network (100) in a disconnected operational mode (202, 203), the device (101) comprising:

a wireless interface (1011) and a processing unit (1012) being configured for monitoring (3001) for at least one wake-up signal (402) in the disconnected operational mode (202, 203) prior to a paging occasion (403); and responsive to detection of the at least one wake-up signal (402), monitoring (3005) for a paging indication (405) in the paging occasion (403);

the at least one wake-up signal (402) being indicative (404) of at least one time-frequency resource element of the paging occasion (403) allocated to the paging indication (405).

EXAMPLE 18. A wireless communication device (101) for communication with a wireless communications network (100) in a disconnected operational mode (202, 203), the device (101) comprising:

a wireless interface (1011) and a processing unit (1012) being configured for monitoring (3001) for at least one wake-up signal (402) included in a beam-swept burst of multiple wake-up signals (402) in the disconnected operational mode (202, 203) prior to a paging occasion (403) included in a beam swept burst of multiple paging occasions (403), wherein the at least one wake-up signal (402) enables the wireless communication device (101) to synchronize with the wireless communications network (100), and wherein the at least one wake-up signal (402) is indicative (404) of at least one time-frequency resource element of the paging occasion (403) allocated to a paging indication (405) that is transmitted using the same downlink transmit beam as the at least one wake-up signal (402); and responsive to detection of the at least one wake-up signal (402), monitoring (3005) the at least one time-frequency resource element of the downlink transmit beam where the wake-up signal (402) was detected for a paging indication (405) based on the detected at least one wake-up signal (402), wherein the detected at least one wake-up signal (402) enables the wireless communication device (101) to receive the paging indication (405) without first monitoring for a synchronization signal block in the paging occasion (403);

the at least one wake-up signal (402) being indicative (404) of at least one time-frequency resource element of the paging occasion (403) allocated to the paging indication (405).

EXAMPLE 19. The wireless communication device (101) of EXAMPLE 17 or 18, the wireless communication device (101) being configured for performing the method (300) of any one of EXAMPLEs 2-16.

EXAMPLE 20. A base station (112) in a wireless communications network (100), the base station (112) comprising:

a wireless interface (1121) and a processing unit (1122) being configured for transmitting (6001) at least one wake-up signal (402) prior to a paging occasion (403); and responsive to transmitting the at least one wake-up signal (402), transmitting (6005) a paging indication (405) in the paging occasion (403);

the at least one wake-up signal (402) being indicative (404) of at least one time-frequency resource element of the paging occasion (403) allocated to the paging indication (405).

EXAMPLE 21. A base station (112) in a wireless communications network (100), the base station (112) comprising:

a wireless interface (1121) and a processing unit (1122) being configured for transmitting (6001) at least one wake-up signal (402) in a beam-swept burst prior to a paging occasion (403) included in a beam swept burst of multiple paging occasions (403)

wherein the at least one wake-up signal (402) enables a wireless communication device (101) to synchronize with the wireless communications network (100), and wherein the at least one wake-up signal (402) is indicative (404) of at least one time-frequency resource element of the paging occasion (403) allocated to a paging indication (405) that is transmitted using the same downlink transmit beam as the at least one wake-up signal (402); and responsive to transmitting the at least one wake-up signal (402), transmitting (6005) a paging indication (405) using the at least one time-frequency resource element of the downlink transmit beam which was used for transmitting the at least one wake-up signal (402), wherein the at least one wake-up signal (402) enables the wireless communication device (101) to receive the paging indication (405) without first monitoring for a synchronization signal block.

The invention claimed is:

1. A method of operating a wireless communication device configured for communication with a wireless communications network in a disconnected operational mode, the method comprising:

monitoring for at least one wake-up signal included in a beam-swept burst of multiple wake-up signals in the disconnected operational mode prior to a paging occasion included in a beam swept burst of multiple paging occasions, wherein the at least one wake-up signal enables the wireless communication device to synchronize with the wireless communications network, and wherein the at least one wake-up signal is indicative of at least one time-frequency resource element of the paging occasion allocated to a paging indication that is transmitted using the same downlink transmit beam as the at least one wake-up signal; and responsive to detection of the at least one wake-up signal, monitoring the at least one time-frequency resource element of the downlink transmit beam where the wake-up signal was detected for a paging indication based on the detected at least one wake-up signal, wherein the detected at least one wake-up signal enables the wireless communication device to receive the paging indication without first monitoring a synchronization signal block.

2. The method of operating the wireless communication device of claim 1, wherein synchronization requirements for detecting the wake-up signal are lighter than for detecting the paging indication.

3. The method of operating the wireless communication device of claim 1, wherein the method further comprises synchronizing with the wireless communications network based on the detection of the wake-up signal.

4. The method of operating a wireless communication device of claim 1, wherein the wake-up signal is detectable by a lower power receiver.

5. The method of claim 1, further comprising:
responsive to the detection of at least two wake-up signals of the beam-swept burst of multiple wake-up signals, selecting one of the at least two wake-up signals and monitoring for the paging indication at the at least one time-frequency resource element of the paging occasion indicated by the selected wake-up signal.

6. The method of claim 1, the wake-up signal relatively indicating the at least one time-frequency resource element with respect to a reference.

7. The method of claim 6, wherein the reference comprises at least one of a timing of the at least one wake-up signal, a frequency of the at least one wake-up signal, or a timing of the paging occasion.

8. The method of claim 1, the wake-up signal being indicative of an index of a frame element of transmission protocol implemented by the wireless communications network, the frame element comprising the at least one time-frequency resource element of the paging occasion.

9. The method of claim 1, the wake-up signal comprising an explicit indicator of the at least one time-frequency resource element or comprising a codebook index associated with a codebook of candidate time-frequency resource elements.

10. The method of claim 1, further comprising
determining at least one further time-frequency resource element of a random-access occasion, based on the at least one time-frequency resource element of the paging occasion, and
responsive to a detection of the paging indication, accessing the random-access occasion.

11. The method of claim 1, further comprising:
responsive to a failed detection of the at least one wake-up signal, monitoring for a synchronization signal block, SSB, broadcasted by the wireless communications network prior to the paging occasion,
responsive to the detection of the at least one wake-up signal, skipping the monitoring for the synchronization signal block broadcasted by the wireless communications network prior to the paging occasion.

12. The method of claim 1, further comprising: based on a receive property of the wake-up signal, determining a receive beam,
wherein the monitoring for the paging occasion is using the receive beam.

13. A wireless communication device for communication with a wireless communications network in a disconnected operational mode, the device comprising:
a wireless interface and a processing unit being configured for monitoring for at least one wake-up signal included in a beam-swept burst of multiple wake-up signals in the disconnected operational mode prior to a paging occasion included in a beam swept burst of multiple paging occasions,
wherein the at least one wake-up signal enables the wireless communication device to synchronize with the wireless communications network, and
wherein the at least one wake-up signal is indicative of at least one time-frequency resource element of the paging occasion allocated to a paging indication that is transmitted using the same downlink transmit beam as the at least one wake-up signal; and
responsive to detection of the at least one wake-up signal, monitoring the at least one time-frequency resource element of the downlink transmit beam where the wake-up signal was detected for a paging indication based on the detected at least one wake-up signal, wherein the detected at least one wake-up signal enables the wireless communication device to receive the paging indication without first monitoring for a synchronization signal block in the paging occasion;
the at least one wake-up signal being indicative of at least one time-frequency resource element of the paging occasion allocated to the paging indication.

14. A base station in a wireless communications network, the base station comprising:
a wireless interface and a processing unit being configured for transmitting at least one wake-up signal in a beam-swept burst prior to a paging occasion included in a beam swept burst of multiple paging occasions
wherein the at least one wake-up signal enables a wireless communication device to synchronize with the wireless communications network, and
wherein the at least one wake-up signal is indicative of at least one time-frequency resource element of the paging occasion allocated to a paging indication that is transmitted using the same downlink transmit beam as the at least one wake-up signal; and
responsive to transmitting the at least one wake-up signal, transmitting a paging indication using the at least one time-frequency resource element of the downlink transmit beam which was used for transmitting the at least one wake-up signal, wherein the at least one wake-up signal enables the wireless communication device to receive the paging indication without first monitoring for a synchronization signal block.

* * * * *